Patented Apr. 16, 1946

2,398,699

UNITED STATES PATENT OFFICE 2,398,699

SIZING COMPOSITIONS

Arthur C. Dreshfield, Wilmington, Del., assignor to Hercules Powder Company, Wilmington, Del., a corporation of Delaware No Drawing. Application September 3, 1941, Serial No. 409,362

11 Claims. (Cl. 106—230)

This invention relates to sizing compositions, and in particular concerns improved dry saponified rosin sizes.

As is well known, saponified rosin size may be prepared and utilized either in dry form or as a liquid or paste in admixture with water. The dry form is usually prepared by spray-drying saponified or partially saponified rosin to form a light dry powder which is particularly adapted to use in sizing operations by reason of its ease and economy of shipment, rapid solution in water, and good sizing efficiency. This type of size, however, has a strong tendency to oxidize and spontaneously decompose in the presence of air, especially if it contains some free rosin or free alkali. Such oxidation and consequent heating is not only highly deleterious to the size itself but also presents a considerable fire hazard during storage and shipment. In addition to being unstable upon storage in the air, the dry rosin size heretofore known has the further disadvantage of being inherently dusty and disagreeable to handle, particularly since it often contains a small proportion of free alkali. Because of their light dry fluffy nature, the size particles readily float in the air and thereby constitute an explosion hazard as well as a menace to the health of those who package or otherwise handle the size.

I have now found that dry rosin sizes comprising saponified rosin or saponified abietic acid may be effectively stabilized against oxidation in the air by the addition of a minor proportion of a wax or wax-like material. Dry rosin sizes stabilized in this manner may be stored for relatively long periods of time without danger of decomposition by oxidation or spontaneous combustion. Furthermore, they are substantially non-dusty, and are hence safer and more agreeable to handle. These advantages are attained without decreasing the sizing efficiency of the size, and, as a matter of fact, the wax-containing dry sizes provided by the invention are in some respects superior in sizing value to the dry sizes heretofore known.

The wax or wax-like material employed in preparing the new dry sizing compositions may be a true wax such as carnauba wax, candelilla wax, ceresin wax, beeswax, montan wax, Japan wax, hydrogenated castor oil, etc., or, more preferably, it may be a wax-like hydrocarbon such as the crystalline, amorphous, or micro-crystalline paraffin waxes of varying melting point, crude scale wax, etc. Accordingly, it will be understood that the term "wax" as herein employed refers to such wax-like hydrocarbons of mineral origin as well as to the true vegetable waxes. Regardless of its nature, the wax is usually employed in an amount representing between about 15 and about 50, preferably between about 20 and about 35, per cent by weight of the entire composition, although the optimum proportion will depend somewhat upon the desired degree of stabilization, the type of size, i. e., whether it is substantially neutral or contains some free rosin or free alkali, and the desired sizing characteristics.

The dry saponified rosin employed in the new compositions may be manufactured from any of the grades of wood or gum rosin, or mixtures thereof, or from rosin which has been partially polymerized by treatment with a polymerization catalyst. The rosin may likewise be one which has been subjected to heat-treatment prior to saponification to an extent sufficient to reduce its tendency to form acid abietate salts but insufficient to form decarboxylation products which are deleterious to sizing operations. Similarly, any caustic alkali, e. g., sodium or potassium hydroxide, may be employed as the saponifying agent, and the saponification reaction may be carried out in such manner that the dry saponified product is substantially neutral or contains a moderate excess of free alkali or free rosin.

The sizing compositions provided by the invention may be prepared simply by mechanically mixing the wax in molten or finely-divided form with dry saponified rosin, although it will usually be found tha a more homogeneous and dustless product will be obtained if the wax is added to the rosin before or during the saponification reaction. A preferred mode of operation consists in incorporating the wax with the size during preparation of the latter by the method described in U. S. Patent No. 2,134,912. Such method essentially comprises introducing molten rosin and the desired proportion of the wax into an autoclave and thereafter forcing a hot aqueous alkali solution of 25-50 per cent by weight concentration into the body of molten rosin under pressure while maintaining the mixture at a temperature of about 135°-190° C. and under its autogenic pressure. Upon completion of the saponification reaction, the mixture is allowed to discharge under its own pressure into a chamber maintained at or below about 78 per cent relative humidity, whereby it is instantly desiccated to a dry non-caking powder having the wax uniformly dispersed therethrough. Alternatively, the wax may be forced into the autoclave after the injection of the alkali. The invention is not limited to such modes of operation, however, and other methods of making the new compositions will be apparent to those skilled in the art.

The following examples will illustrate several ways in which the principle of the invention has been applied, but are not to be construed as limiting the same.

*Example I*

A mixture of 20.2 parts by weight of G gum rosin, 10.8 parts by weight of I wood rosin, and 8.93 parts by weight of paraffin wax (melting point = 58°–60° C.) was charged into an oil-jacketed autoclave and heated to a temperature of 149° C., after which 3.83 parts by weight of sodium hydroxide in the form of a hot concentrated aqueous solution was forced in at the bottom of the autoclave under a pressure of about 120 lbs./sq. in. The mixture was heated at a temperature of 150°–175° C. for a period of 20 minutes while venting the autoclave to maintain a pressure of 80–110 lbs./sq. in., after which it was allowed to discharge at a temperature of 176° C. and under a pressure of 110 lbs./sq. in. into a large drying chamber. The sizing composition so obtained was substantially neutral and contained 20 per cent by weight of the wax. It was considerably less dusty than a similar size which contained no wax, and had a 4-hour oxygen demand value of about 0.44 per cent. Ordinary dry saponified rosin size has an average 4-hour oxygen demand value of about 3.7 per cent.

*Example II*

A mixture of 65 parts by weight of G gum rosin, 35 parts by weight of I wood rosin, and 28.8 parts by weight of paraffin wax was saponified with 12.1 parts by weight of sodium hydroxide to form a dry size in a manner substantially the same as that described in Example I. In the same manner there was prepared a dry size from which the wax was omitted. The stability of each of these sizes to atmospheric oxidation was obtained by a determination of their 4-hour, 24-hour, and 48-hour oxygen demand values in an oxygen absorption train. These values were as follows:

| Size composition | Oxygen demand value, percent | | |
| --- | --- | --- | --- |
| | 4-hour | 24-hour | 48-hour |
| Dry saponified rosin, 80%; wax, 20% | 0.21 | 1.39 | 1.90 |
| Dry saponified rosin, 100% | 2.17 | 6.25 | 7.88 |

A greater degree of stabilization in the wax-containing size may be obtained by employing a somewhat larger proportion, e. g. 30–40 per cent by weight, of the wax. Similar results may be obtained with other waxes and wax-like materials.

In addition to being considerably less dusty and more stable to oxidation than the dry saponified rosin sizes heretofore known, the sizing compositions provided by the invention have the particular advantage of being capable of direct addition to the beater in the sizing operation without causing the formation of wax spots on the paper. Heretofore, in sizing paper stock with wax and rosin size it has been deemed necessary either to form separate solutions or dispersions of the rosin size and wax and add them separately to the beater, or to resort to highly complicated dispersing methods. The use of the present compositions obviates the steps of forming and handling separate wax and size dispersions, and the use of special dispersing operations.

Other modes of applying the principle of the invention may be employed instead of those explained, change being made as regards the materials or methods herein disclosed, provided the product stated by any of the following claims, or the equivalent of such stated product, be obtained.

What I claim and desire to protect by Letters Patent is:

1. A non-dusty dry saponified rosin sizing composition readily dispersible in water and resistant to oxidation in the air, comprising saponified rosin in the form of a dry powder and, as the only added material increasing the resistance of the saponified rosin to oxidation in the air, a wax incorporated with the saponified rosin in an amount representing between about 15% and about 50% by weight of the entire composition, said wax serving to increase the resistance of the saponified rosin to oxidation in the air and to render it substantially non-dusty.

2. A non-dusty dry saponified rosin sizing composition readily dispersible in water and resistant to oxidation in the air, comprising saponified rosin in the form of a dry powder and, as the only added material increasing the resistance of the saponified rosin to oxidation in the air, a wax incorporated with the saponified rosin in an amount representing between about 20% and about 35% by weight of the entire composition, said wax serving to increase the resistance of the saponified rosin to oxidation in the air and to render it substantially non-dusty.

3. A non-dusty dry saponified rosin sizing composition readily dispersible in water and resistant to oxidation in the air, comprising saponified rosin in the form of a dry powder and, as the only added material increasing the resistance of the saponified rosin to oxidation in the air, a wax-like hydrocarbon incorporated with the saponified rosin in an amount representing between about 15% and about 50% by weight of the entire composition, said wax-like hydrocarbon serving to increase the resistance of the saponified rosin to oxidation in the air and to render it substantially non-dusty.

4. A non-dusty dry saponified rosin sizing composition readily dispersible in water and resistant to oxidation in the air, comprising saponified rosin in the form of a dry powder and, as the only added material increasing the resistance of the saponified rosin to oxidation in the air, a wax-like hydrocarbon incorporated with the saponified rosin in an amount representing between about 20% and about 35% by weight of the entire composition, said wax-like hydrocarbon serving to increase the resistance of the saponified rosin to oxidation in the air and to render it substantially non-dusty.

5. A non-dusty dry saponified rosin sizing composition readily dispersible in water and resistant to oxidation in the air, comprising saponified rosin in the form of a dry powder and, as the only added material increasing the resistance of the saponified rosin to oxidation in the air, a paraffin wax incorporated with the saponified rosin in an amount representing between about 15% and about 50% by weight of the entire composition, said paraffin wax serving to increase the resistance of the saponified rosin to oxidation in the air and to render it substantially non-dusty.

6. A non-dusty dry saponified rosin sizing composition readily dispersible in water and resistant to oxidation in the air, comprising saponified rosin in the form of a dry powder and, as the only added material increasing the resistance of the saponified rosin to oxidation in the air, a paraffin wax incorporated with the saponified rosin in an amount representing between about 20% and about 35% by weight of the entire composition, said paraffin wax serving to increase the resistance of the saponified rosin to oxidation in the air and to render it substantially non-dusty.

7. A non-dusty dry saponified rosin sizing composition readily dispersible in water and resistant to oxidation in the air, comprising substantially neutral saponified rosin in the form of a dry powder and, as the only added material increasing the resistance of the saponified rosin to oxidation in the air, a wax incorporated with the saponified rosin in an amount representing between about 15% and about 50% by weight of the entire composition, said wax serving to increase the resistance of the saponified rosin to oxidation in the air and to render it substantially non-dusty.

8. A non-dusty dry saponified rosin sizing composition readily dispersible in water and resistant to oxidation in the air, comprising substantially neutral saponified rosin in the form of a dry powder and, as the only added material increasing the resistance of the saponified rosin to oxidation in the air, a paraffin wax incorporated with the saponified rosin in an amount representing between about 15% and about 50% by weight of the entire composition, said paraffin wax serving to increase the resistance of the saponified rosin to oxidation in the air and to render it substantially non-dusty.

9. A non-dusty dry saponified rosin sizing composition readily dispersible in water and resistant to oxidation in the air, comprising substantially neutral saponified rosin in the form of a dry powder and, as the only added material increasing the resistance of the saponified rosin to oxidation in the air, a paraffin wax incorporated with the saponified rosin in an amount representing between about 20% and about 35% by weight of the entire composition, said paraffin wax serving to increase the resistance of the saponified rosin to oxidation in the air and to render it substantially non-dusty.

10. A non-dusty dry saponified rosin sizing composition readily dispersible in water and resistant to oxidation in the air, comprising saponified rosin, free alkali, and, as the only added material increasing the resistance of the saponified rosin to oxidation in the air, a wax incorporated with the saponified rosin in an amount representing between about 15% and about 50% by weight of the entire composition, said wax serving to increase the resistance of the saponified rosin to oxidation in the air and to render it substantially non-dusty.

11. A non-dusty dry saponified rosin sizing composition readily dispersible in water and resistant to oxidation in the air, comprising saponified rosin, free alkali, and, as the only added material increasing the resistance of the saponified rosin to oxidation in the air, a paraffin wax incorporated with the saponified rosin in an amount representing between about 20% and about 35% by weight of the entire composition, said paraffin wax serving to increase the resistance of the saponified rosin to oxidation in the air and to render it substantially non-dusty.

ARTHUR C. DRESHFIELD.

Certificate of Correction

Patent No. 2,398,699. April 16, 1946.

ARTHUR C. DRESHFIELD

It is hereby certified that error appears in the printed specification of the above numbered patent requiring correction as follows: Page 1, first column, line 29, for "not found" read *now found*; and that the said Letters Patent should be read with this correction therein that the same may conform to the record of the case in the Patent Office.

Signed and sealed this 4th day of June, A. D. 1946.

[SEAL]

LESLIE FRAZER,
*First Assistant Commissioner of Patents.*

6. A non-dusty dry saponified rosin sizing composition readily dispersible in water and resistant to oxidation in the air, comprising saponified rosin in the form of a dry powder and, as the only added material increasing the resistance of the saponified rosin to oxidation in the air, a paraffin wax incorporated with the saponified rosin in an amount representing between about 20% and about 35% by weight of the entire composition, said paraffin wax serving to increase the resistance of the saponified rosin to oxidation in the air and to render it substantially non-dusty.

7. A non-dusty dry saponified rosin sizing composition readily dispersible in water and resistant to oxidation in the air, comprising substantially neutral saponified rosin in the form of a dry powder and, as the only added material increasing the resistance of the saponified rosin to oxidation in the air, a wax incorporated with the saponified rosin in an amount representing between about 15% and about 50% by weight of the entire composition, said wax serving to increase the resistance of the saponified rosin to oxidation in the air and to render it substantially non-dusty.

8. A non-dusty dry saponified rosin sizing composition readily dispersible in water and resistant to oxidation in the air, comprising substantially neutral saponified rosin in the form of a dry powder and, as the only added material increasing the resistance of the saponified rosin to oxidation in the air, a paraffin wax incorporated with the saponified rosin in an amount representing between about 15% and about 50% by weight of the entire composition, said paraffin wax serving to increase the resistance of the saponified rosin to oxidation in the air and to render it substantially non-dusty.

9. A non-dusty dry saponified rosin sizing composition readily dispersible in water and resistant to oxidation in the air, comprising substantially neutral saponified rosin in the form of a dry powder and, as the only added material increasing the resistance of the saponified rosin to oxidation in the air, a paraffin wax incorporated with the saponified rosin in an amount representing between about 20% and about 35% by weight of the entire composition, said paraffin wax serving to increase the resistance of the saponified rosin to oxidation in the air and to render it substantially non-dusty.

10. A non-dusty dry saponified rosin sizing composition readily dispersible in water and resistant to oxidation in the air, comprising saponified rosin, free alkali, and, as the only added material increasing the resistance of the saponified rosin to oxidation in the air, a wax incorporated with the saponified rosin in an amount representing between about 15% and about 50% by weight of the entire composition, said wax serving to increase the resistance of the saponified rosin to oxidation in the air and to render it substantially non-dusty.

11. A non-dusty dry saponified rosin sizing composition readily dispersible in water and resistant to oxidation in the air, comprising saponified rosin, free alkali, and, as the only added material increasing the resistance of the saponified rosin to oxidation in the air, a paraffin wax incorporated with the saponified rosin in an amount representing between about 20% and about 35% by weight of the entire composition, said paraffin wax serving to increase the resistance of the saponified rosin to oxidation in the air and to render it substantially non-dusty.

ARTHUR C. DRESHFIELD.

Certificate of Correction

Patent No. 2,398,699.   April 16, 1946.

ARTHUR C. DRESHFIELD

It is hereby certified that error appears in the printed specification of the above numbered patent requiring correction as follows: Page 1, first column, line 29, for "not found" read *now found*; and that the said Letters Patent should be read with this correction therein that the same may conform to the record of the case in the Patent Office.

Signed and sealed this 4th day of June, A. D. 1946.

[SEAL]

LESLIE FRAZER,
*First Assistant Commissioner of Patents.*